United States Patent

Grimes

[11] Patent Number: 5,921,610
[45] Date of Patent: Jul. 13, 1999

[54] ADJUSTABLE RESTING SURFACES FOR AUTOMOTIVE INTERIOR TRIM

[75] Inventor: John A. Grimes, Dover, N.H.

[73] Assignee: Davidson Textron Inc., Dover, N.H.

[21] Appl. No.: 09/154,611

[22] Filed: Sep. 17, 1998

Related U.S. Application Data

[63] ntinuation of application No. 08/583,880, Jan. 11, 1996., Pat. No. 5,816,645

[51] Int. Cl.$^6$ ........................................ B60J 9/00
[52] U.S. Cl. ........................................ 296/153
[58] Field of Search .................. 296/153; 297/DIG. 8, 297/411.36, 411.38

[56] References Cited

U.S. PATENT DOCUMENTS

| | | |
|---|---|---|
| 1,873,414 | 8/1932 | Jarvis . |
| 1,892,048 | 12/1932 | Genung . |
| 2,144,233 | 1/1939 | Stewart . |
| 2,598,299 | 5/1952 | Prosser . |
| 2,627,077 | 2/1953 | Forsyth . |
| 2,787,494 | 4/1957 | Beck . |
| 3,185,497 | 5/1965 | LaGace . |
| 3,255,470 | 6/1966 | Knittel et al. . |
| 3,272,491 | 9/1966 | Knittel . |
| 3,648,306 | 3/1972 | Auerbach . |
| 4,534,593 | 8/1985 | Ojala . |
| 4,538,854 | 9/1985 | Wilson . |
| 4,619,478 | 10/1986 | Heimnick et al. . |
| 4,629,253 | 12/1986 | Williams . |
| 4,659,135 | 4/1987 | Johnson . |
| 4,674,790 | 6/1987 | Johnson . |
| 4,778,216 | 10/1988 | Stupakis . |
| 5,060,328 | 10/1991 | Larson . |
| 5,141,279 | 8/1992 | Weller . |
| 5,203,604 | 4/1993 | Emley, Jr. . |

Primary Examiner—Gary C. Hoge
Attorney, Agent, or Firm—Reising, Ethington, Barnes, Kisselle, Learman & McCulloch P.C.

[57] ABSTRACT

An arm rest (18, 20, 22) is mounted for vertical adjustment relative to the door panel (14) or center console (16). The arm rest is operably connected to an air spring bladder (32, 46, 54) or an adjustable mechanical mechanism (72). The bladder is controlled by a pump (40) and switch (41). The mechanism (72) is controlled by an electric motor (70).

8 Claims, 5 Drawing Sheets

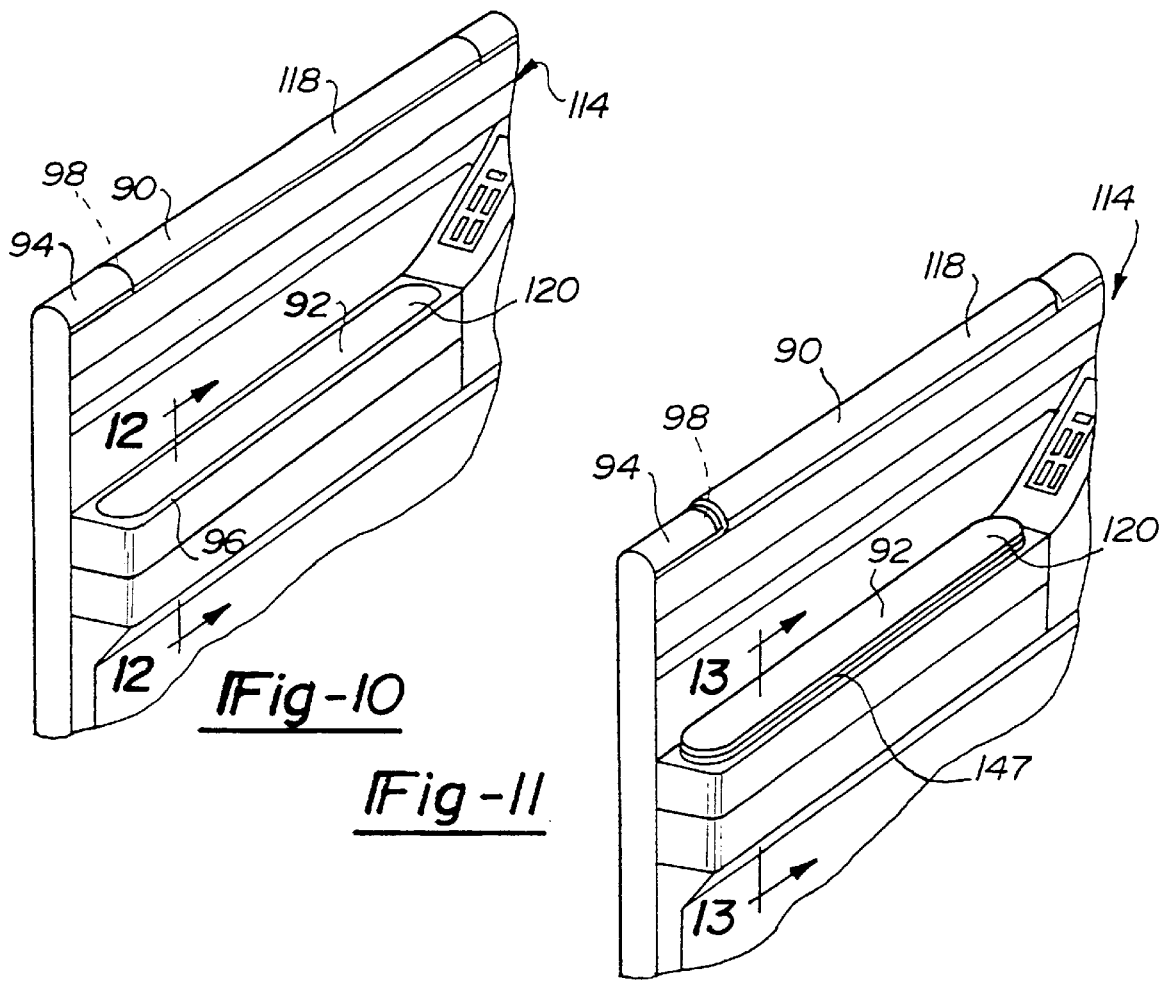
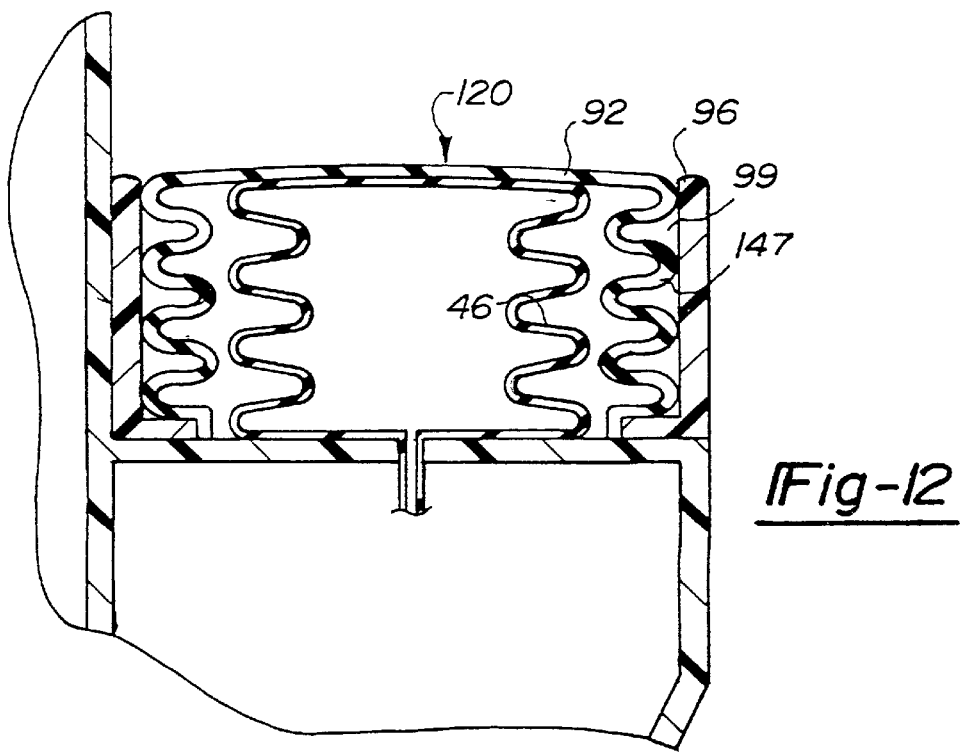

ADJUSTABLE RESTING SURFACES FOR AUTOMOTIVE INTERIOR TRIM

This application is a continuation of Ser. No. 08/583,880 filed Jan. 11, 1996 now U.S. Pat. No. 5,816,645.

TECHNICAL FIELD

The field of this invention relates to automotive interior trim and more particularly to adjustable resting surfaces such as arm rests.

BACKGROUND OF THE DISCLOSURE

Arm rests have long been incorporated for the convenience and comfort of both a driver and passenger of automotive vehicles. Arm rests have been attached to or formed as part of the interior door panel. Other centrally located arm rests have been foldable into the car seat or have been mounted on top of a central console.

Adjustments to car seats and steering wheels have long been incorporated to accommodate differently sized people. The steering wheel has been made to tilt up and down as well as extend rearwardly or retract forwardly. Motorized seats are now common that can adjust vertically as well as fore and aft to accommodate for different leg lengths. Adjustments can also be made to tilt the seat at varying positions. Furthermore, air inflated lumbar supports are known that support the driver's lower back.

When the seats are adjusted vertically to lift or lower the occupant, the occupant's arm and elbow are also raised or lowered. Presently, the arm rests that are incorporated on a central console or in the door panel do not follow the adjustment of the seat. The fixed arm rests are designed to be properly positioned to fit the profile of an average driver for that vehicle. However, many drivers do not fit the average driver profile and either are differently sized or merely desire the position of the seat differently from another person of similar size. Most drivers adjust a seat for having their legs comfortably positioned with respect to the operating pedals. Many drivers face the undesirable consequence of having the arm rests out of the optimum position. The undesirable consequential position of the arm rest may result in the arm rest no longer being used because it is out of reach.

What is needed is an arm rest or other resting surface that can have its vertical or horizontal position adjusted to provide for added comfort and usage for various seat positions and variously sized people.

SUMMARY OF THE DISCLOSURE

In accordance with one aspect of the invention, an arm rest for an automotive interior includes an adjustment mechanism for adjusting the vertical position of the arm rest relative to the automotive interior. The adjustment mechanism has a base end affixed in the automotive interior. The adjustment mechanism has a distal end attached to the arm rest for raising and lowering the arm rest. Preferably, the adjustment mechanism adjusts the arm rest for adjustment at any height from a preset low position to a preset high position. In one embodiment, the adjustment mechanism is a gas spring positioned under the arm rest.

A control mechanism is operably connected to the adjustment mechanism for controlling the raising and lowering of the arm rest. Preferably, the controlling mechanism is a gas pump and valve mechanism for pumping gas into the gas spring for raising the arm rest and exhausting the gas for lowering the arm rest.

In one embodiment, the adjustable arm rest is positioned on the belt line of a door panel for an automotive interior. In another embodiment, the adjustable arm rest is mounted on an interiorly extending ledge of an interior door panel. In yet another embodiment, the adjustable arm rest is mounted on the top a centrally located interior console.

Alternate embodiments can incorporate a mechanical lifting device such as screw mechanism controllably driven by a motor.

In accordance with another aspect of the invention, an automotive trim panel includes a base member that has a cavity therein. A bellow member has a top resting surface, and bellow shaped side walls that extend into the cavity. The resting surface has a first position being substantially contoured with the surrounding base member portion about the cavity. The bellow shaped side walls are concealed within the cavity when the resting surface is in the first position. The bellow shaped side walls are concealed within the cavity when the resting surface is in the first position. The resting surface can be raised to a second raised position where the bellow shaped side walls extend and are partially revealed above the base member portion about the cavity.

In accordance with another aspect of the invention, a combination arm rest and console for an automotive interior includes an outer housing affixed to the automotive interior and a container mounted in the outer housing for vertical adjustment in a plurality of fixed vertical positions. A combination arm rest and container cover member is movably mounted on the top section of the container between an open position and closed position with respect to the container. An adjustment mechanism raises and lowers both the container and the combination arm rest and container cover member. A control mechanism is operably connected to the adjustment mechanism for controlling the raising and lowering of the container and the combination arm rest and container cover member.

BRIEF DESCRIPTION OF THE DRAWINGS

Reference now is made to the accompanying drawings in which:

FIG. 10 is an enlarged perspective view of the door panel showing an alternate embodiment;

FIG. 11 is a view similar to FIG. 10 showing the belt line arm rest and side arm rest in a raised position;

FIG. 12 is a cross sectional view taken along lines 12—12 shown in FIG. 10;

DETAILED DESCRIPTION OF THE PREFERRED EMBODIMENT

Figure 1:
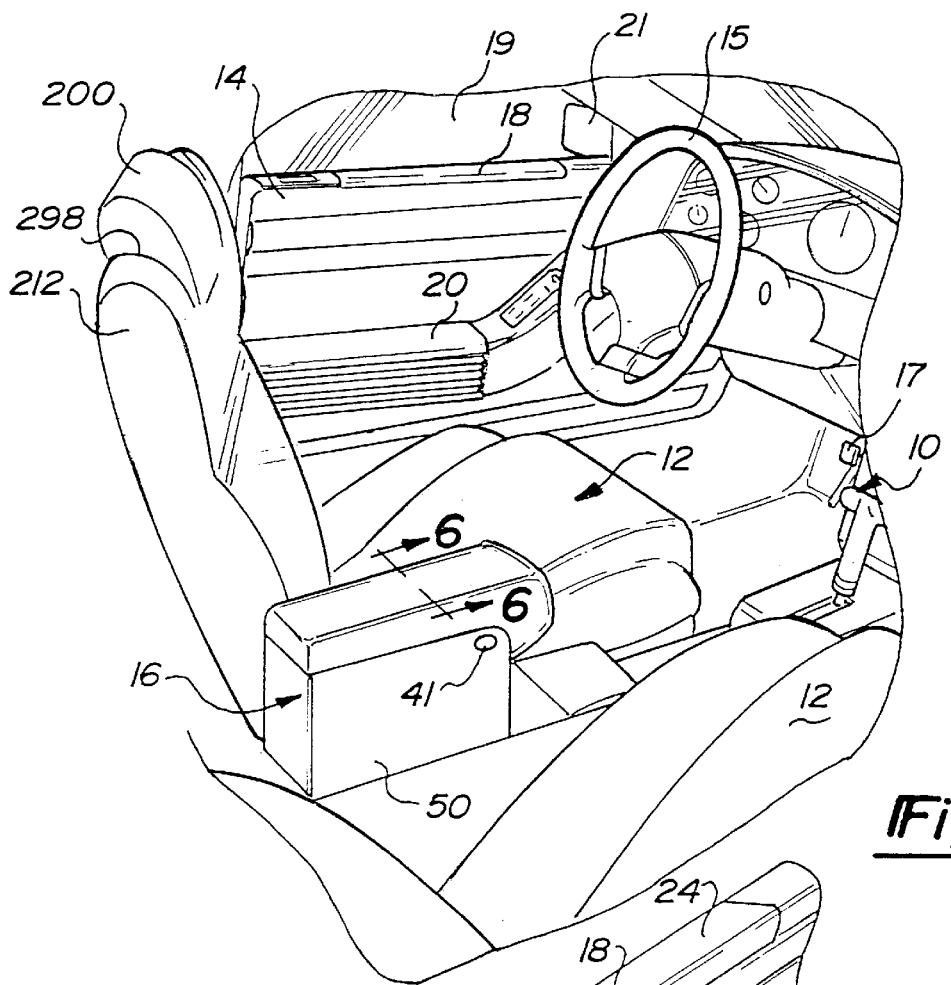
FIG. 1 is a fragmentary perspective view of an automotive interior incorporating the invention.

Referring now to FIG. 1, an automotive interior 10 includes two adjustable front passenger seats 12, with head rests 13, a driver and passenger interior door panel (only the driver door panel 14 is shown for simplicity of the drawing) and a center console 16. A steering wheel 15 and operating pedals 17 are conventionally positioned in front of the driver's seat 12. The interior door panel 14 includes a belt line arm rest 18 at the lower edge of window opening 19 to the rear of side view mirror 21 and an integral formed mid-arm rest 20. The center console 16 has a top arm rest 22. The arm rests 18, 20 and 22 are all vertically adjustable as described in detail below.

Figure 2:
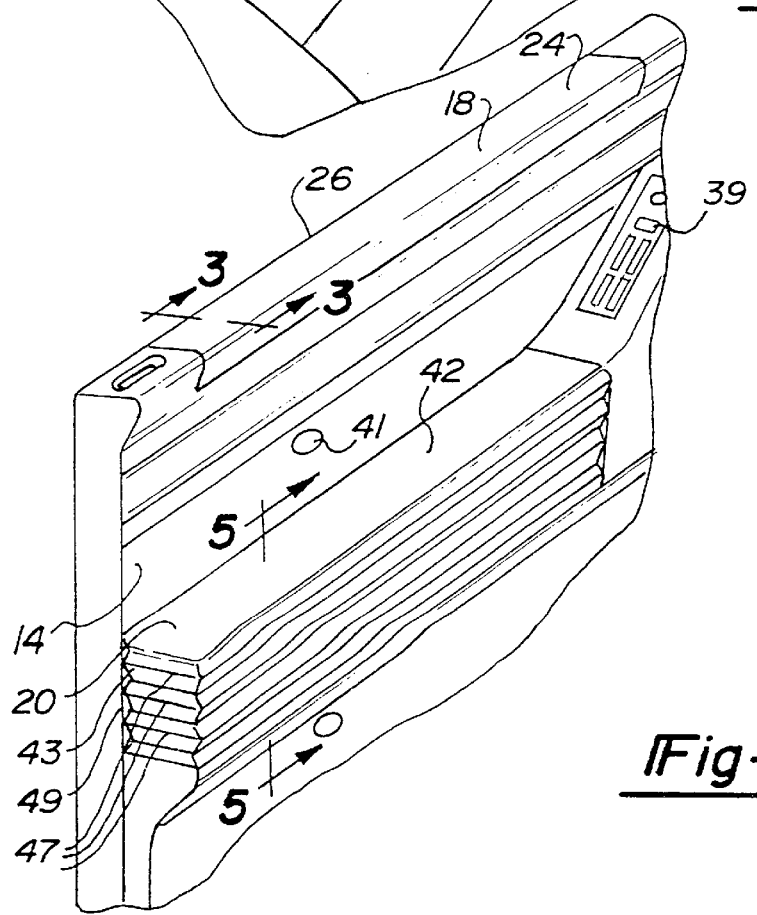
FIG. 2 is an enlarged perspective view of the door panel shown in FIG. 1.
Figure 3:
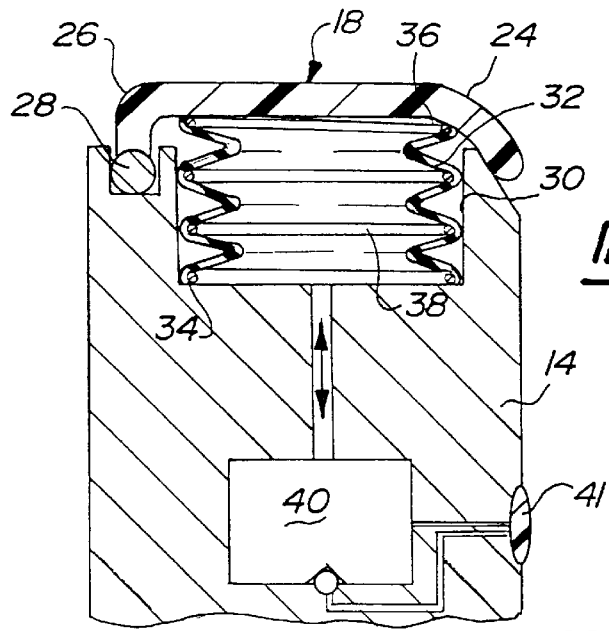
FIG. 3 is a cross sectional view taken along lines 3—3 shown in FIG. 2 showing a belt line arm rest in a lower position.
Figure 4:
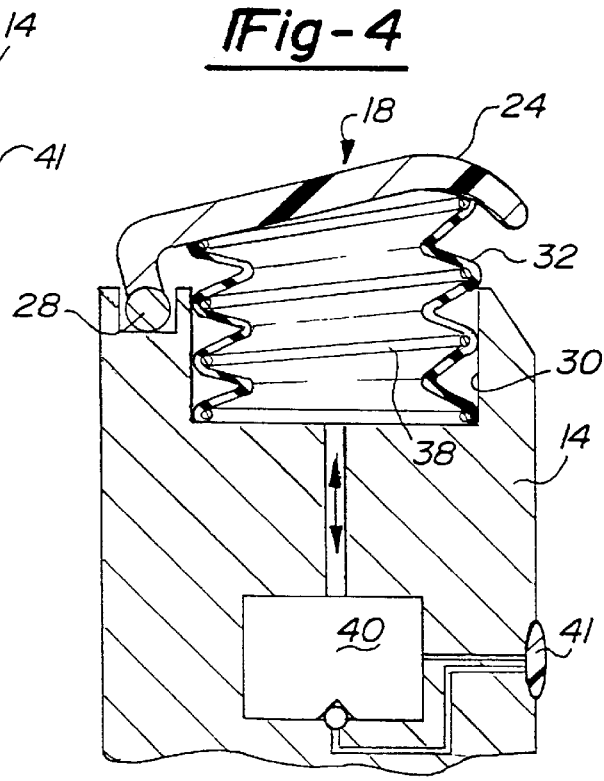
FIG. 4 is a view similar to FIG. 3 showing the belt line arm rest in a raised position.

Reference now is made to FIGS. 2, 3 and 4 for further description of belt line arm rest 16. The belt line arm rest 18 has a padded contoured upper surface 24. The outer or window facing edge 26 is pivotably mounted through a hinge 28 to the door panel 14. The door panel has a pocket 30 with an upper opening that houses an air spring bladder 32. The air spring bladder 32 has a bottom end 34 anchored to the panel 14 and an upper end 36 secured to the arm rest 18. The bladder may incorporate a tension coil spring 38 that pulls down the arm rest 18 to the low position as shown in FIG. 3.

The bladder is operably connected to an electrically operated air pump 40 that can pump air into the bladder to expand it to the position shown in FIG. 4. An electric control switch 41 is operably connected to the pump and can be manually operated to either direct the pump to pump air into the bladder or out of the bladder. For this embodiment and the following described embodiments, the air pump 40 can be remotely mounted. Furthermore, the switch 41 can be desirably positioned in a variety of easily accessible locations including being incorporated in window and lock control cluster 39.

When air is pumped into the air spring bladder, the arm rest 16 is pivoted such that the padded top surface 24 is moved upwardly as shown in FIG. 4. The pump can also be operated to withdraw air from the bladder to return the arm rest 16 to the position shown in FIG. 3. The tension spring 38 assists in returning the arm rest 18 to the position shown in FIG. 3.

Figure 5:
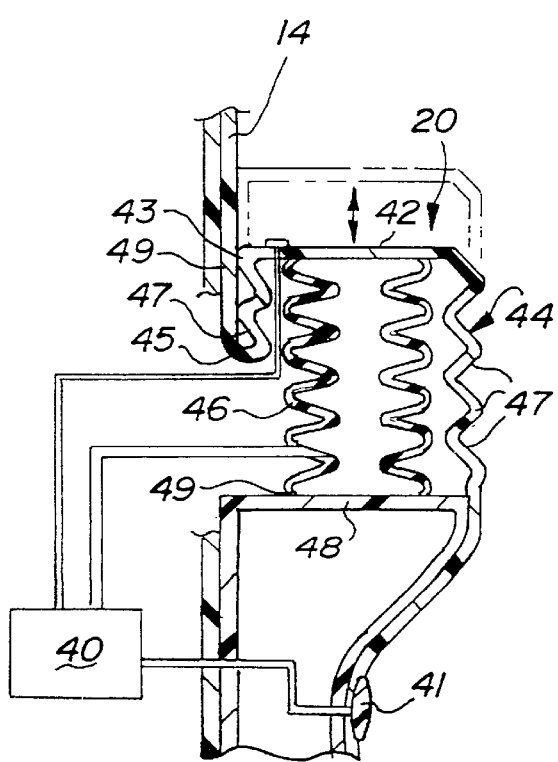
FIG. 5 is a cross sectional view taken along lines 5—5 shown in FIG. 2.

The arm rest 20 may also be made to be vertically adjusted as shown in detail in FIGS. 2 and 5. The arm rest 20 is integrally formed as part of interior panel 14. The arm rest 20 includes top padded surface 42 and side surfaces 44 with spring acting convolutions 47. The upper few convolutions 47 extend about the arm rest such that the door facing edge 43 of the padded upper surface 42 is free to vertically move with respect to the adjacent vertical door panel section 49. The vertical door panel section 49 is attached to the bottom of the of the upper few convolutions 47 such that a groove 45 is formed between the edge 43 and vertical door section 49.

An air spring bladder 46 is mounted under the surface 42 and connected thereto. The air spring has its bottom end 49 mounted on panel ledge 48. As with the belt line arm rest 18, the bladder 46 is operably connected to air pump 40 which is controlled by switch 41.

When air is pumped into the air spring bladder 46, the arm rest surface 44 is moved upwardly as shown in phantom in FIG. 5. The pump can also have a bypass valve 45 operated by the switch 41 to withdraw air from the bladder to return the arm rest to the position shown in solid in FIG. 5. The side surfaces 44 with convolutions 47 function as a tension spring to assist in returning the arm rest 20 to the lower position shown in FIG. 5. In this way, the bladder 46 does not need its own tension spring.

Figure 6:
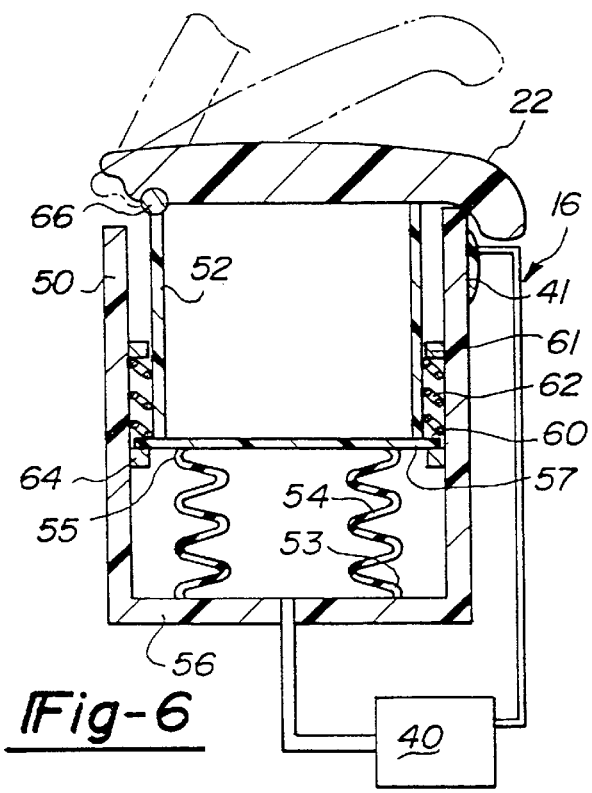
FIG. 6 is an enlarged cross sectional view of the console taken along lines 6—6 shown in FIG. 1.
Figure 7:
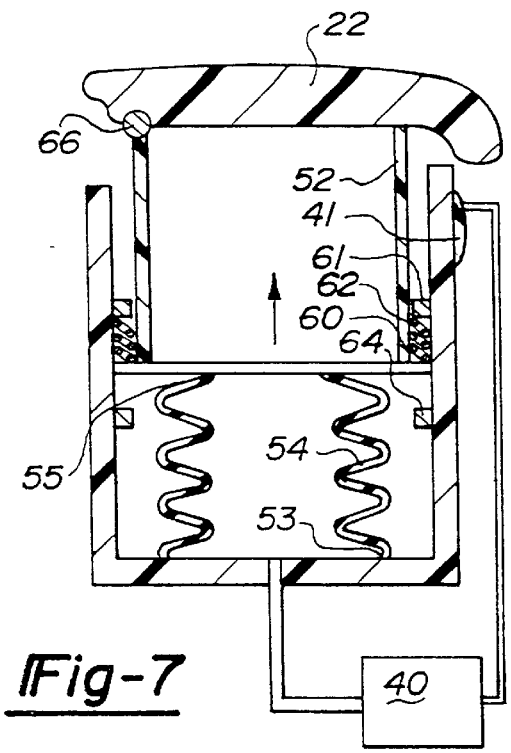
FIG. 7 is a view similar to FIG. 6 showing the map container and combination arm rest and cover member in an elevated position.

Reference is now made to FIGS. 6 and 7 which disclose a center console with an adjustable arm rest 22. The center console 16 has an outer housing 50 affixed to the automotive interior 10. A map container 52 is slidably mounted in the outer housing 50 for vertical movement with respect to the housing 50.

An air spring bladder 54 is mounted below the map container 52 such that the bottom end 53 is affixed to the bottom 56 of outer housing 50. The top end 55 is affixed to the bottom 57 of the map container 52. The map container and outer housing have appropriate ledges 60 and 61 to house compression springs 62 that bias the map container 52 to the lowest position defined by stop 64 on the outer housing 50 as shown in FIG. 6.

The arm rest 22 is pivotably mounted at hinge 66 to the map container for being pivotably movable between a closed position shown in FIGS. 6 and 7 and an open position as shown in phantom in FIG. 6. Consequently the arm rest 22 also functions as a closure member for the map container 52. The arm rest 22 may be appropriately padded and have a leather or other cosmetically attractive textured vinyl surface.

As with the previously two arm rests 18 and 20, the air spring bladder 54 is operably connected to air pump 40 which is controlled by electric switch 41.

When air is pumped into the air spring bladder 54, the arm rest surface 22 is moved upwardly to the position shown in FIG. 7. The pump can also be operated to withdraw air from the bladder to return it to the position shown in FIG. 6. The compression springs 62 assist in returning the arm rest 22 and map container 52 to the lower position shown in FIG. 6.

The arm rest 22 can pivot between the open and closed position when it is in either the lower position shown in FIG. 6 or the raised position shown in FIG. 7.

Figure 8:
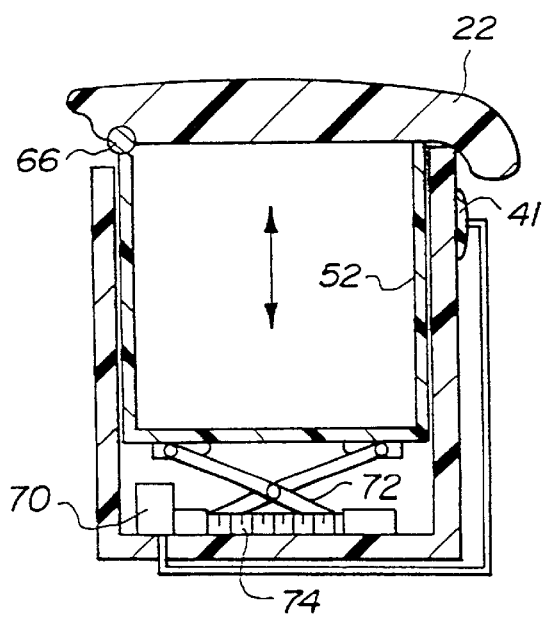
FIG. 8 is a view similar to FIG. 6 showing an alternate adjustment and control mechanism for raising and lowering the map container and combination arm rest and cover.
Figure 9:
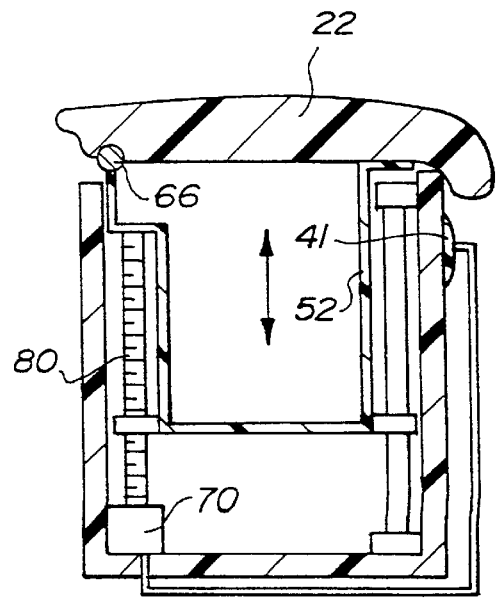
FIG. 9 is a view similar to FIG. 8 showing another embodiment.

FIGS. 8 and 9 show two alternate embodiments that provide for continuously variable adjustment between a lowest position and a highest position. As shown in FIG. 8, the air spring bladder 54, pump 40 and compression springs 62 are replaced with an electric motor 70 and mechanical lift mechanism 72. The lift mechanism 72 is a scissors type linkage operably connected to a horizontally disposed rotating screw 74. The screw is rotated in either direction by reversible motor 70 which is connected to switch 41. The scissors mechanism can lift and secure the map container 52 and arm rest 22 to any position between the lowest and highest design position. The scissors mechanism gearing is such that when in any position locks the map container and arm rest 22 in the selected position regardless of the downward pressure exerted on the arm rest 22 by the weight of an arm or body of a person.

The embodiment shown in FIG. 9 operates by replacing the scissors lift mechanism with a vertically operated screw 80 that is connected to a threaded follower nut 82 mounted to the map container 42. The screw 80 is rotated in either direction by reversible motor 84 which is connected to switch 41. The rotation of screw 82 raises or lowers the map container 52 and arm rest 22. A guide post 86 is mounted on the other side of the map container 42 through a guide bearing 85 to offer guidance and assure the map container does not undesirably tilt. As the screw lifts or lowers nut 82 and the map container 42, the bearing 85 slides up or down guide post 86.

FIGS. 10–14 disclose another interior door panel 114 with another belt line arm rest 118 and another mid-arm rest 120. As shown in FIGS. 10 and 12, the rest surfaces 90 and 92 of the respective arm rests are combined with the surrounding surfaces 94 and 96 of the panel 114 about respective cavities 98 and 99. Each rest surface 90 and 92 are connected to respective bellow shaped side walls 147 that are concealed when the arm rests are in a lower position shown in FIG. 10.

Figure 13:
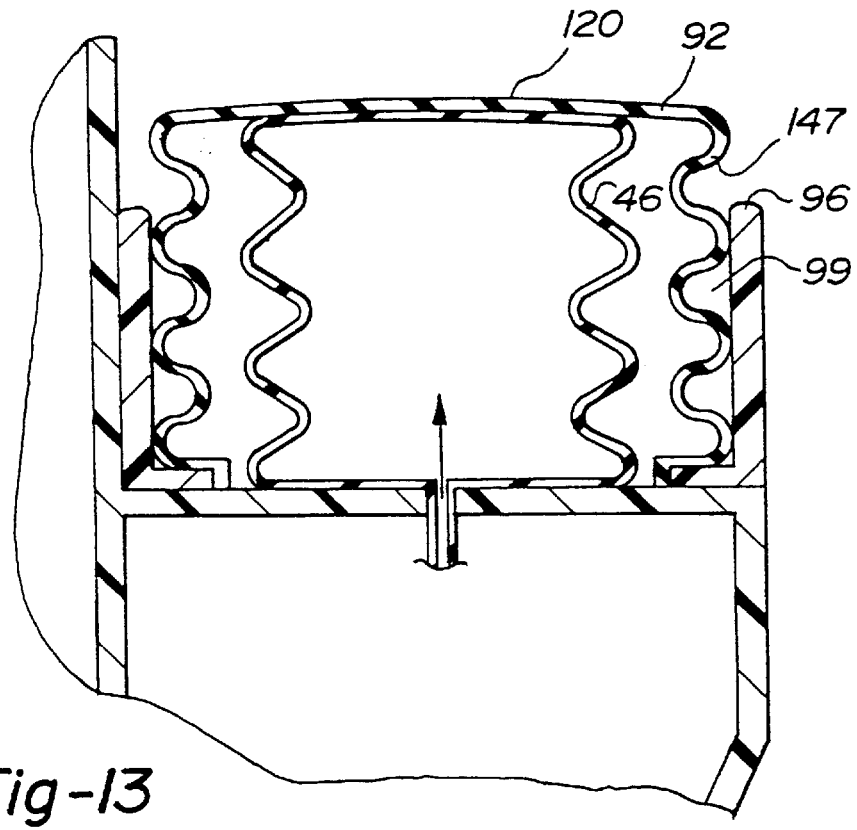
FIG. 13 is a view similar to FIG. 12 showing the arm rest in the raised position.
Figure 14:
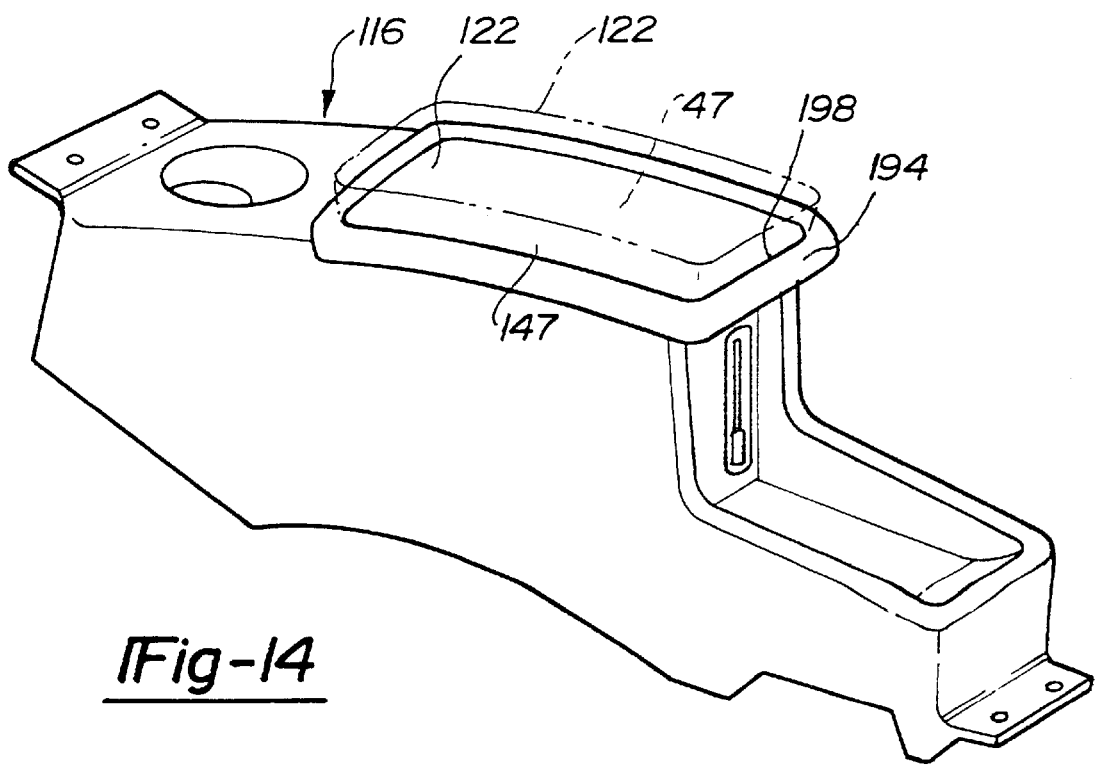
FIG. 14 is a view of an alternate embodiment of a center console with an arm rest.

An air bladder 46 can be pumped with air to raise the arm rest surfaces 90 and 92 to the positions shown in FIGS. 11 and 13. In this position the bellow shaped side walls 147 become partially revealed. The same contouring of an arm rest surface 122 and bellow shaped side walls 147 can be applied to a center console 116 as shown in FIG. 14. The console 116 has a surrounding surface member wall 194 about a center cavity 198. The cavity 198 seats an inner bladder 47 (not shown) and arm rest surface 122 that is integrally formed with bellow shaped side walls 147. Air pumped into the bladder can raise the arm rest surface 122 above the surrounding wall surface 194 to the position shown in phantom.

As shown in FIG. 1, the concept of contoured raisable rest surfaces may also be applied to head rest 200 mounted within cavity 298 in seat back 212 of seat 12.

In this fashion, a driver no longer needs to compromise the comfort of his arm positions in favor of his leg position. The arm rests can be adjusted vertically to accommodate for low or high arm positions. The arm rest, whether it is located at the belt line of the door, or lower on the door panel or at the center console can be adjusted such that their use is maximized and the comfort of the occupant is optimized. The adjustments can be made in infinitesimal amounts between a lowest and highest position. Adjustment to the center console arm rest can be made without affecting the opening and closing of the arm rest member on top of the map container within the console.

It is also foreseen that these adjustable arm rests can be easily incorporated with feed back sensors and be part of known memory systems where the push of single bottom can automatically adjust the arm rests to a preselected position along with the automatic adjustment of the automatic seats 12, mirrors 21, and steering wheel 15.

Other variations and modifications are possible without departing from the scope and spirit of the present invention as defined by the appended claims.

The embodiments in which an exclusive property or privilege is claimed are defined as follows:

1. An automotive interior trim assembly including a resting surface for a component of an occupant; said assembly characterized by:

a base member having a cavity therein;

said resting surface covering said cavity and having a first position substantially contoured with said base member portion surrounding said cavity;

said resting surface supported by bellow shaped side walls;

an inflatable member positioned under said resting surface for pushing said resting surface outward from said first position to a raised second position; and said resting surface forming an arm rest in an interior door panel.

2. An automotive interior trim assembly as defined in claim 1 further characterized by:

said bellow shaped side walls being concealed in said cavity when said resting surface is in said first position.

3. An automotive interior trim assembly as defined in claim 1 further characterized by:

said bellow shaped side walls being at least partially visible under said resting surface when said resting surface is in said raised second position.

4. An automotive interior trim assembly as defined in claim 1 further characterized by:

said bellow shaped sidewalls being incorporated in said inflatable member.

5. An automotive interior trim assembly including a resting surface for a component of an occupant; said assembly characterized by:

a base member having a cavity therein;

said resting surface covering said cavity and having a first position substantially contoured with said base member portion surrounding said cavity;

said resting surface supported by bellow shaped side walls;

an inflatable member positioned under said resting surface for pushing said resting surface outward from said first position to a raised second position; and said resting surface being integrally formed with said bellow shaped side walls.

6. An automotive interior trim assembly as defined in claim 5 further characterized by:

said bellow shaped side walls being concealed in said cavity when said resting surface is in said first position.

7. An automotive interior trim assembly as defined in claim 5 further characterized by:

said bellow shaped side walls being at least partially visible under said resting surface when said resting surface is in said raised second position.

8. An automotive interior trim assembly as defined in claim 5 further characterized by:

said bellow shaped sidewalls being incorporated in said inflatable member.

* * * * *